US011137927B2

United States Patent
Aloni et al.

(10) Patent No.: US 11,137,927 B2
(45) Date of Patent: *Oct. 5, 2021

(54) STORAGE MIRRORING DECISION BY CAPABILITY SETS

(71) Applicant: INTERNATIONAL BUSINESS MACHINES CORPORATION, Armonk, NY (US)

(72) Inventors: Miron Aloni, Rishon Lezion (IL); Ohad Atia, Haifa (IL); Amelia Avraham, Petach Tikva (IL); Shay Berman, Modlin (IL); Ran Harel, Kfar-Saba (IL); Erez A. Theodorou, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/150,039

(22) Filed: Oct. 2, 2018

(65) Prior Publication Data

US 2019/0034089 A1     Jan. 31, 2019

Related U.S. Application Data

(63) Continuation of application No. 14/988,950, filed on Jan. 6, 2016, now Pat. No. 10,126,975.

(51) Int. Cl.
    *G06F 3/00*             (2006.01)
    *G06F 3/06*             (2006.01)
    *G06F 12/0868*      (2016.01)

(52) U.S. Cl.
CPC ............ *G06F 3/065* (2013.01); *G06F 3/0605* (2013.01); *G06F 3/067* (2013.01); *G06F 3/0619* (2013.01);

(Continued)

(58) Field of Classification Search
None
See application file for complete search history.

(56) References Cited

U.S. PATENT DOCUMENTS 6,718,347 B1    4/2004   Wilson
7,162,575 B2    1/2007   Dalal et al.
(Continued)

OTHER PUBLICATIONS

Wright et al "A Constaints-Based Resource Discovery Model for Multi-Provider Cloud Environments," Journal of Cloud Computing: Advances, Systems and Application, Jun. 21, 2012 (23 Pages).

(Continued)

*Primary Examiner* — Craig S Goldschmidt
(74) *Attorney, Agent, or Firm* — Griffiths & Seaton PLLC

(57) ABSTRACT

Methods, computing systems and computer program products implement embodiments of the present invention that include defining multiple storage capabilities for a set of storage resources in multiple storage systems, the storage resources including storage space, and identifying two of the storage systems including one or more storage capabilities required by a first logical volume. A first given identified storage system is configured to store the first logical volume, and a second given identified storage system is configured to store a second logical volume, the second given storage system different from the first given storage system. Upon storing data to the first logical volume, the data can be mirrored to the second logical volume. In some embodiments, a software defined storage system can be configured including defined services, wherein the first given storage system includes a first given service, and wherein the second given storage system includes a second given service.

18 Claims, 4 Drawing Sheets

(52) U.S. Cl.
CPC .......... *G06F 3/0631* (2013.01); *G06F 3/0683* (2013.01); *G06F 12/0868* (2013.01); *G06F 2212/1032* (2013.01); *G06F 2212/261* (2013.01); *G06F 2212/283* (2013.01); *G06F 2212/313* (2013.01)

(56) References Cited

U.S. PATENT DOCUMENTS

| | | | |
|---|---|---|---|
| 7,693,877 | B1 | 4/2010 | Zasman |
| 9,639,459 | B2 | 5/2017 | Jones et al. |
| 10,158,908 | B1 | 12/2018 | Ramani et al. |
| 2004/0123062 | A1* | 6/2004 | Dalal .................. G06F 11/1096 711/170 |
| 2006/0064541 | A1* | 3/2006 | Kano .................... G06F 3/0605 711/114 |
| 2006/0090055 | A1* | 4/2006 | Itoh ...................... G06F 3/0605 711/170 |
| 2006/0224852 | A1 | 10/2006 | Kottomtharayil et al. |
| 2009/0019251 | A1 | 1/2009 | Helman et al. |
| 2010/0257326 | A1 | 10/2010 | Otani et al. |
| 2012/0011328 | A1* | 1/2012 | Burton ................ G06F 3/0607 711/154 |
| 2012/0278129 | A1 | 11/2012 | Salomatin et al. |
| 2013/0311986 | A1 | 11/2013 | Arrouye et al. |
| 2013/0318297 | A1* | 11/2013 | Jibbe ...................... G06F 3/061 711/114 |
| 2014/0078344 | A1 | 3/2014 | Yoon et al. |
| 2014/0079344 | A1 | 3/2014 | Quehl et al. |
| 2014/0129719 | A1 | 5/2014 | Weber et al. |
| 2015/0058467 | A1 | 2/2015 | Douglas et al. |
| 2015/0120916 | A1* | 4/2015 | Frattura .............. H04L 12/4641 709/224 |
| 2016/0098225 | A1 | 4/2016 | Huang et al. |
| 2017/0192681 | A1 | 7/2017 | Aloni et al. |
| 2017/0192682 | A1 | 7/2017 | Atia et al. |
| 2017/0262216 | A1 | 9/2017 | Polkovnikov et al. |

OTHER PUBLICATIONS

Bermes et al. "Digital Preservation st the National Library in France: A Technical and Organizational Overview" World Library and Information Congress: 74th IFLA General Conference and Council, 2008 (10 Pages).
U.S. Appl. No. 14/988,965, filed Jan. 6, 2016 (30 pages).
U.S. Appl. No. 14/988,950, filed Jan. 6, 2016 (35 Pages).
U.S. Appl. No. 14/988,933, filed Jan. 6, 2016 (27 pages).
List of IBM Patents or Patent Applications Treated as Related dated Jun. 25, 2020 (2 pages).

* cited by examiner

STORAGE MIRRORING DECISION BY CAPABILITY SETS

CROSS-REFERENCE TO RELATED APPLICATIONS

This Application is a Continuation of U.S. patent application Ser. No. 14/988,950, filed on Jan. 6, 2016, the contents of which are hereby incorporated by reference.

FIELD OF THE INVENTION

The present invention relates generally to data mirroring, and specifically to selecting physical and virtual systems for data mirroring based on their respective storage capabilities.

BACKGROUND

In a software-defined storage (SDS) system, storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

Various embodiments for data mirroring in a data storage system are provided herein. In accordance with an embodiment of the present invention, a method includes identifying two storage systems of a plurality of storage systems having one or more storage capabilities required by a first logical volume; configuring a first given identified storage system to store the first logical volume, the first given storage system having a first physical storage controller controlling multiple respective first storage devices; configuring a second given identified storage system to store a second logical volume, the second given storage system having a second physical storage controller controlling multiple respective second storage devices such that the second given storage system is different from the first given storage system; and upon storing data to the first logical volume, mirroring the data to the second logical volume.

BRIEF DESCRIPTION OF THE DRAWINGS

The disclosure is herein described, by way of example only, with reference to the accompanying drawings, wherein.

DETAILED DESCRIPTION OF EMBODIMENTS

Mirroring is a technique used to replicate a primary storage volume to a separate secondary storage volume, in order to ensure redundancy. For a storage facility comprising primary and secondary storage volumes, mirroring can be implemented either synchronously or asynchronously. During synchronous mirroring, a host (e.g., a database server) communicating with the storage facility receives a write acknowledgement after data is successfully written to both the primary and the secondary storage volumes. Synchronous mirroring is typically implemented over high speed local networks such as storage area networks.

During asynchronous mirroring, the host receives the write acknowledgement after the data is written to the primary volume (i.e., the secondary volume may have not yet received the data and/or may not have acknowledged writing the data). Asynchronous mirroring is typically implemented over lower speed wide area networks, especially over greater distances.

Embodiments of the present invention enable physical storage systems and systems implementing storage abstraction (e.g., a software defined storage system) to perform data mirroring. As described hereinbelow, multiple storage capabilities are defined for a set of storage resources in multiple storage systems, the storage resources comprising storage space. Two of the storage systems comprising one or more storage capabilities required by a first logical volume are identified, and a first given identified storage system is configured to store the first logical volume. A second given identified storage system is configured to store a second logical volume (the second given storage system different from the first given storage system), and upon storing data to the first logical volume, the data is mirrored to the second logical volume.

Figure 1:
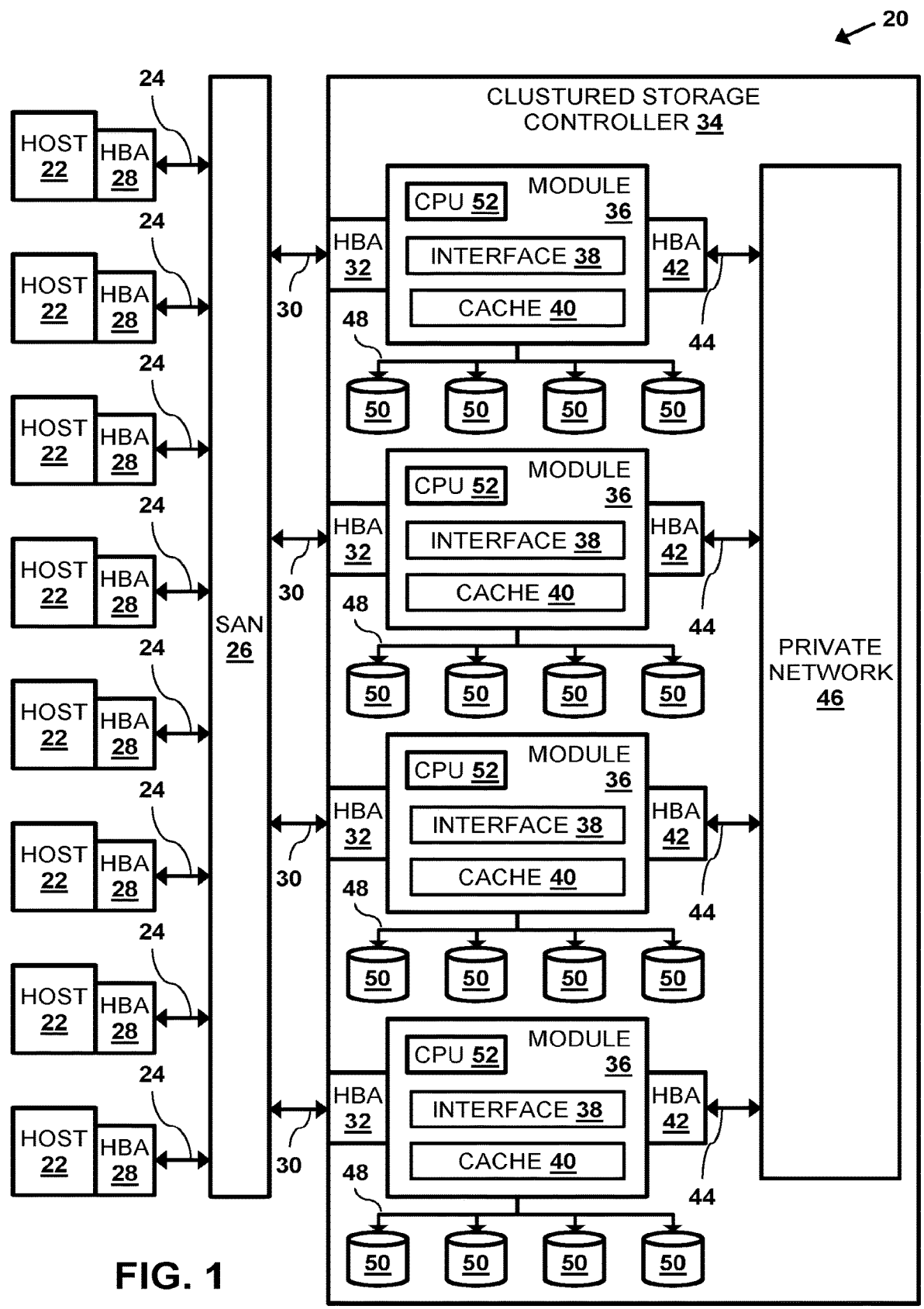
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
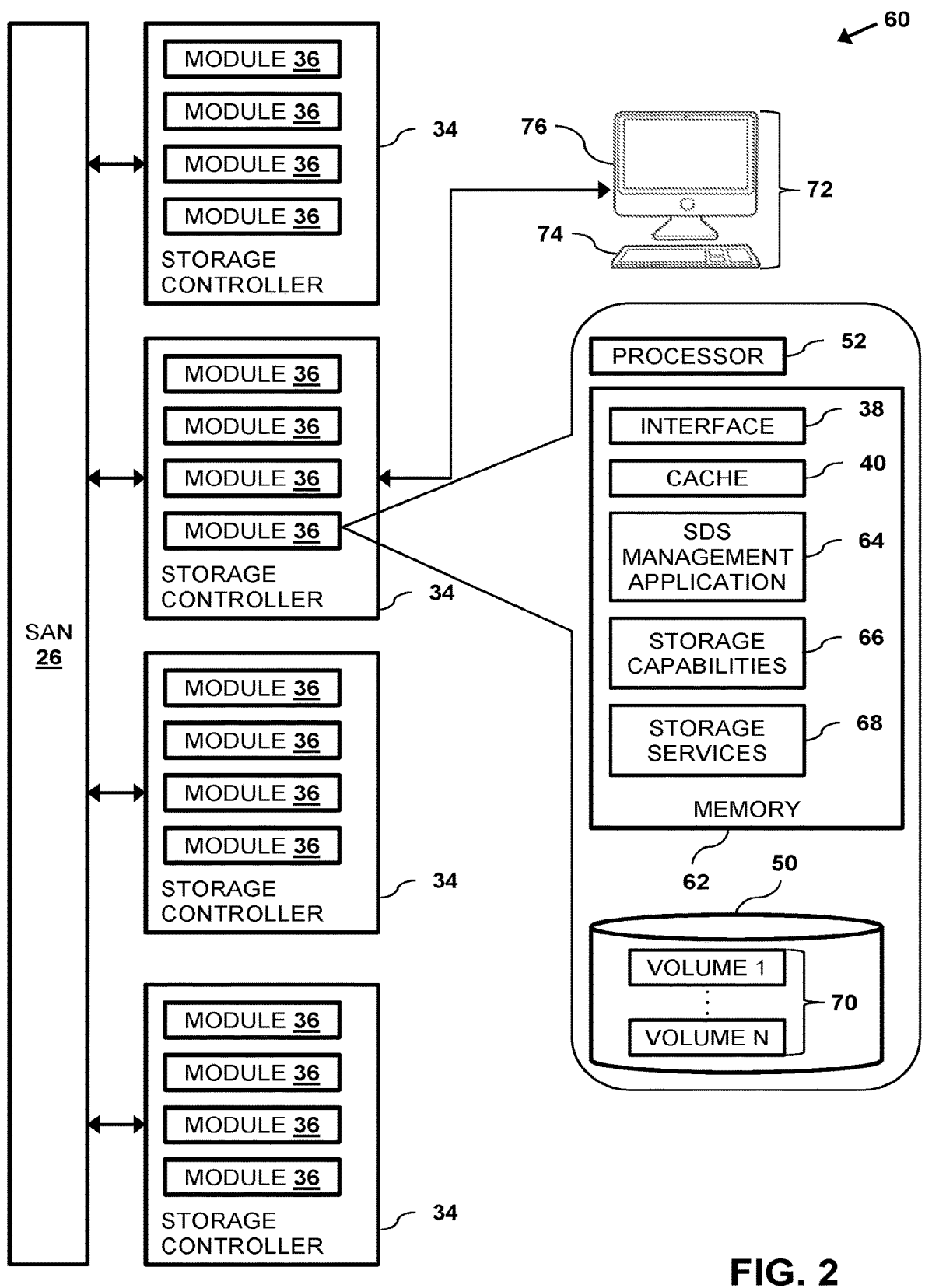
FIG. 2 is a block diagram that schematically illustrates configuration of multiple storage controllers configured as a software-defined storage (SDS) system, in accordance with an embodiment of the present invention.

FIG. 2 is a block diagram that schematically illustrates a SDS system 60 comprising multiple storage controllers 34, in accordance with an embodiment of the present invention. While FIG. 2 shows SDS system 60 comprising multiple clustered storage controllers 34, configuring the SDS system using any type of storage systems is considered to be within the spirit and scope of the present invention.

Each module 36 stores cache 38 and interface 40 in a memory 62. In one or more of modules 36, memory 62 stores an SDS management application 64, a set of storage capabilities 66 and a set of storage services 68. Processor 52 executes SDS management application 64 that uses storage resources in storage controllers 34 to configure and manage SDS system 60. In embodiments where SDS management application 64 executes in more than one module 36, the SDS management application can be configured as a distributed software application to manage SDS system 60.

In some embodiments, SDS system 60 managed by SDS management application 64 comprises storage resources in one or more modules 36 in one or more storage controllers 34 including a given module 36 comprising the SDS management application. In alternative embodiments, SDS system 60 comprises one or more modules 36 in one or more storage controllers 34 wherein none of the modules having the storage resources used by SDS system 60 include the SDS management application that manages the SDS system.

In embodiments of the present invention, the storage resources comprise physical and logical resources in storage controllers 34 such as storage space, processor resources such as processor utilization and networking resources such as network throughput. For example, storage devices 50 may comprise a mix of solid state disk drives (SSDs), higher capacity "slower" hard disk drives and lower capacity "faster disk drives, and the storage space may be allocated as blocks of storage space (e.g., 100 MB) on each type of the storage devise.

Storage capabilities 66 comprise various methods that storage services that SDS system 60 can offer for storing data such as encryption, compression and thin provisioned storage pools. In some embodiments, different types/levels of compression and different types/levels of encryption may be stored as separate storage capabilities 66.

Storage services 68 comprise blocks of storage resources configured with one or more storage capabilities. For example, a first given storage service 58 may comprise 128 MB of compressed storage space on an SSD, and a second given storage service 58 may comprise 500 GB of encrypted storage space on a hard drive that is configured as a thin pool.

In some embodiments, the storage resource may comprise logical volumes 70. In the configuration shown in FIG. 2, storage devices 50 comprise storage space that processor 52 can partition into logical volumes 70. Each logical volume can be stored on a single storage device 50 or can be distributed among multiple storage devices 50 in one or more storage controllers 34. Therefore a given storage service 68 may be distributed over multiple storage devices 50 and/or multiple storage controllers 34.

One or more storage controllers 34 may be coupled to a console (e.g., a data terminal) 72 comprising a keyboard 74 and a display 76. A given processor 52 can present, on display 76, status information for SDS system 60, and can receive, from keyboard 74, inputs from a user to configure the SDS system. In some embodiments, the functionality of console 72 can be performed by any computing device (e.g., a given host computer 22) in communication with storage controllers 34 (i.e., SDS system 60).

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Data Mirroring Configuration and Operation

Figure 3:
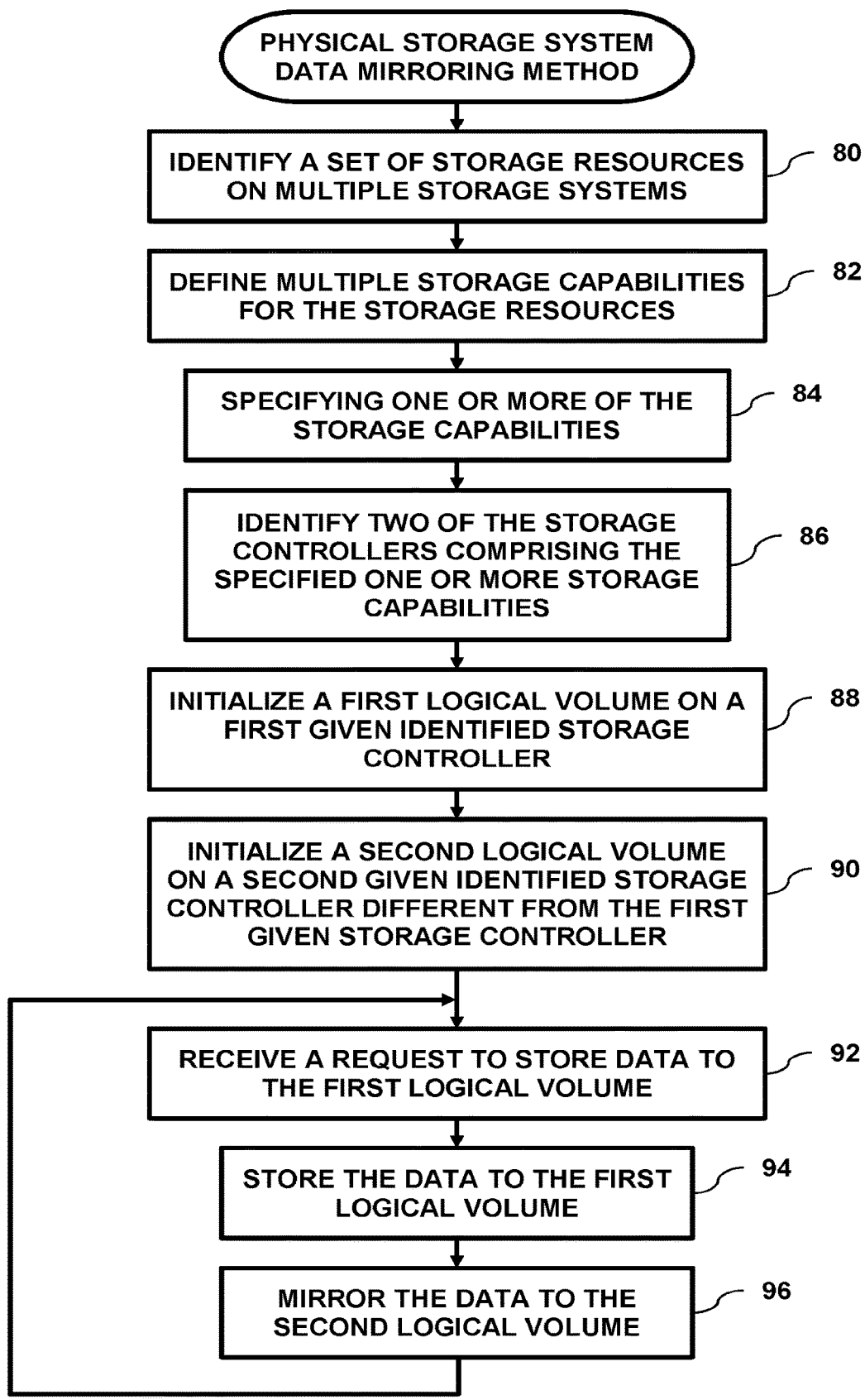
FIG. 3 is a flow diagram that schematically illustrates a method of mirroring data in a set of the storage controllers, in accordance with an embodiment of the preset invention.

FIG. 3 is a flow diagram that schematically illustrates a method of configuring two storage controllers 34 to store and mirror data, in accordance with an embodiment of the present invention. In a first identification step 80, processor 52 identifies a set of storage resources in storage controllers 34, and in a definition step 82, the processor defines multiple storage capabilities 66 for the identified storage resources.

In a specification step 84, processor 52 specifies one or more storage capabilities 66 to be used by logical volume(s) 70 to store data, and in a second identification step 86, the processor identifies two storage controllers 34 comprising the one or more specified storage capabilities. In some embodiments, processor 52 can identify the two storage controllers 34 comprising the one or more specified storage capabilities by presenting, on display 76, a list of storage controllers 34 that comprise the one or more specified storage capabilities, and receive an input from a user via keyboard 74 (or any other input device such as a mouse) indicating the two storage controllers 34 comprising the one or more specified storage capabilities.

One or more of the identified storage controllers may comprise additional storage capabilities not included in the one or more specified storage capabilities. For example, the specified storage capability may be compression, and a first given identified storage controller may support compression and encryption, and a second given identified storage controller may support compression and thin provisioning.

In an first initialization step 88, processor 52 initializes a first given logical volume 70 on a first given identified storage controller (also referred to herein as a source storage controller), and in a second initialization step 90, the processor initializes a second given volume 70 in a second given identified storage controller (also referred to herein as a destination storage controller) that is different from the first given identified storage controller. As described hereinbelow, processor 52 mirrors data from the first given volume to the second given volume. In embodiments of the present invention, the mirroring may comprise either synchronous mirroring or asynchronous mirroring. In synchronous mirroring, the storage resources of the source and the destination storage controllers are typically the same, whereas in asynchronous mirroring, the storage resources of the destination storage controller may comprise storage devices 50 that are slower than the storage devices in the primary storage controller.

In a receive step 92, processor 52 receives, from a given host computer 22, a request to store data to the first given logical volume, and in a storing step 94, the processor stores the received data to the first given (i.e., primary) volume. Finally, in a mirroring step 96, processor 52 mirrors the received data to the second given logical (i.e., secondary) volume, and the method continues with step 92.

Figure 4:
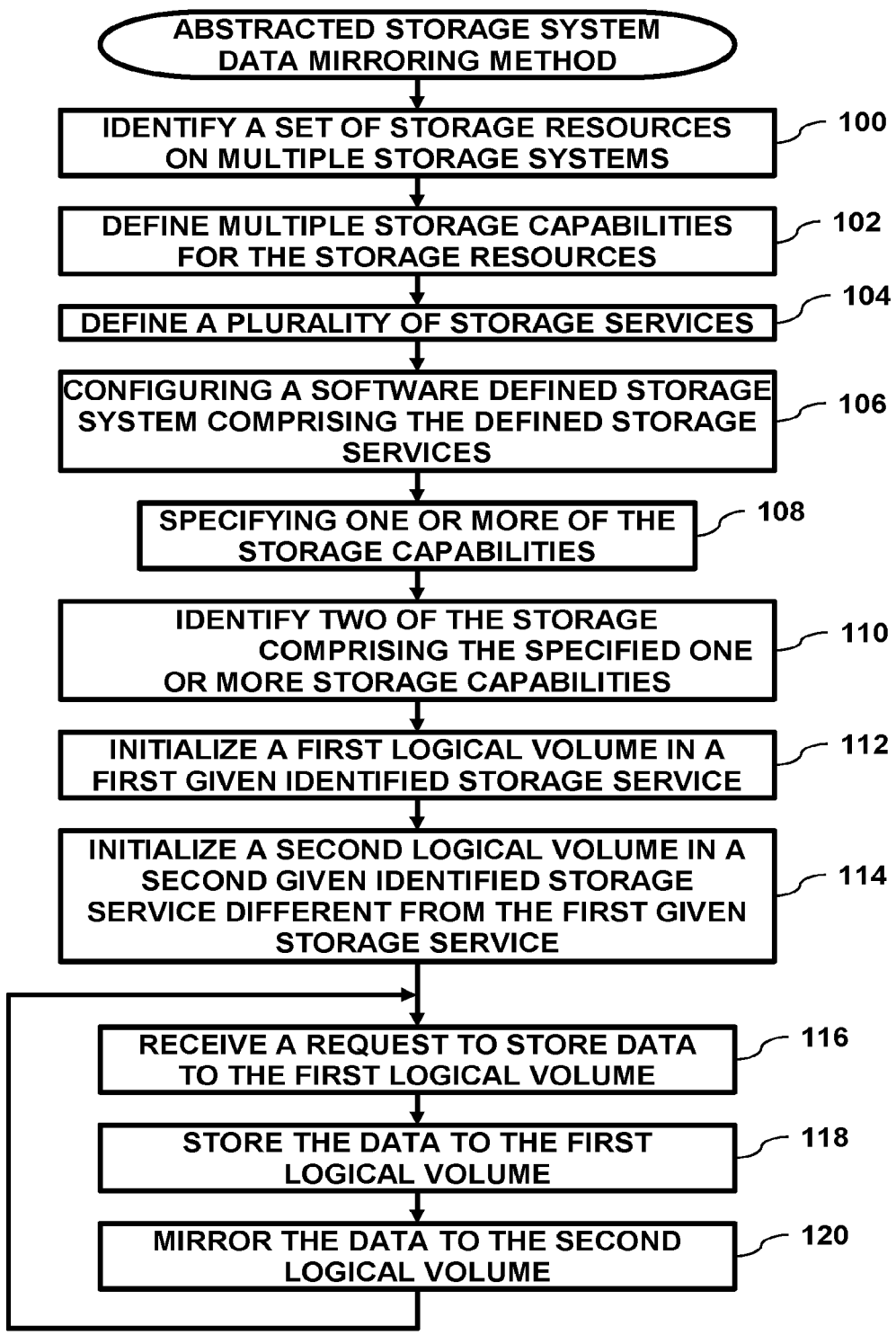
FIG. 4, is a flow diagram that schematically illustrates a method of mirroring data in a software defined storage system, in accordance with an embodiment of the preset invention.

FIG. 4 is a flow diagram that schematically illustrates a method of configuring an abstracted storage system such as SDS system 60 to store and mirror data, in accordance with an embodiment of the present invention. When mirroring data, storage services 68 can implement, in SDS system 60, functionalities of the physical storage controllers described in the method shown in the flow diagram in FIG. 3.

In a first identification step 100, SDS management application 64 identifies a set of storage resources in storage controllers 34, and in a first definition step 102, the SDS management application defines multiple storage capabilities 66 for the identified storage resources. In a second definition step 104, SDS management application 64 defines a plurality of software services 68 that comprise the identified storage resources and the defined storage capabilities 66, and in a configuration step 106, the SDS management application configures SDS system 60 comprising the defined software services. The storage resources, the storage capabilities and the storage services are described supra in the description referencing FIG. 2.

In a specification step 108, SDS management application 64 specifies one or more storage capabilities to be used for data to be stored and mirrored on SDS system 60, and in a second identification step 110, the SDS management application identifies two of the storage services in the SDS system that comprise the one or more specified capabilities. Either or both of the identified storage services may comprise one or more additional storage capabilities 66 not included in the one or more specified capabilities.

In some embodiments, SDS management application 64 can identify the two storage services comprising the one or more specified storage capabilities by presenting, on display 76, a list of storage services 68 that comprise the one or more specified storage capabilities, and receive an input from a user via keyboard 74 (or any other input device such as a mouse) indicating the two storage services comprising the one or more specified storage capabilities.

In a first initialization step 112, SDS management application 64 initializes a first given volume 70 (also referred to herein as a primary volume) on a first given identified storage service 68, and in a second initialization step 114, the SDS management application initializes a second logical volume 70 (also referred to herein as a secondary volume) on a second given identified storage service that is different than the first given identified storage service. Since the secondary volume needs to be accessible in the event of a failure to access the primary logical volume, the first and the second identified storage services are typically stored on separate storage controllers 34.

In a receive step 116, SDS management application 64 receives, from a given host computer 22, a request to store data to the primary volume, and in a storing step 118, the SDS management application stores the received data to the primary volume. Finally, in a mirroring step 120, processor 52 mirrors the received data to the secondary volume, and the method continues with step 116.

In SDS system 60, mirroring is special capability in the sense that it requires a source (i.e., primary) storage space that stores source data and a separate destination (i.e., secondary) mirrored storage space that stores a mirrored copy of the source data. As mirrors are usually used for fail-over, high-availability or backup needs, the source and the destination storage spaces are typically stored on different systems, possibly at different sites. This presents the storage administrator with duplicate work, since to effect mirroring, the storage administrator needs to find two spaces in two sites that (a) fulfill the application/user requirements for space, and (b) match one another, in the sense that storage system A volume can indeed by mirrored into storage system B.

For example, if storage system A comprises compressed data volumes, and storage system B does not have any compressed data volumes, then mirroring into storage system B will be irrelevant since even if the data is copied, the mirrored data will not be able to be retrieved.

In embodiments of the present invention, the source storage space comprises a first given storage service that includes one or more storage capabilities 66, and the destination storage space comprises a second given storage service 68, and processor 52 processes the mirroring request by mirroring the source data from the first given storage service to the second given storage service. As described supra, the source and the destination storage spaces are typically stored on different systems, possibly at different sites. Therefore, the set of the storage resources required to perform mirroring operations are typically distributed among multiple physical storage systems, and wherein a first given storage controller 34 (i.e., a first given storage system) comprises a first given storage service 68, and wherein SDS management application 64 can identify a second given storage service by identifying second given storage controller 34 by identifying a second given storage controller 34 (i.e., a second given physical storage system) comprising a second given storage service 68.

Therefore, systems implementing the second embodiment enable SDS management application 64 to automatically identify and offer a set of one or more destination storage controllers 34 that can mirror a source storage controller 34, according to their respective set(s) of storage capabilities 66. This also enables a storage administrator to have several storage controllers 34 mirroring a single storage controller 34, since all storage controllers 34 that are suitable may be used.

When implementing mirroring on SDS system 60, given a certain service A, SDS management application 64 goes through all available services S and checks if they are suitable for mirroring service A. If they are, they are suggested to the storage administrator. Using the definitions set above: Given a source service A and a set of services S, SDS management application 64 goes over every service s in S and returns a list of all storage services 68 that can act as target mirroring sites. The storage administrator may then decide which services to use as mirrors.

The flow can either decide by calculating in the storage systems management system, or by sending a question to the services themselves, assuming they have a management system of their own. In embodiments of the present invention, a service B is suitable for mirroring service A, if all of the following conditions are met:

B has connectivity to A. In other words, all storage controllers 34 in B have connectivity to all storage controllers 34s in A.

B has sufficient capacity to mirror A. This means that if B is already mirroring other services, it should check if it has any space left, considering all the other mirroring commitments.

Service B comprises a set of storage capabilities 66 that allows for Service A data to be mirrored. This means one of the following should apply: (i) B is A. Of course, this option is less preferred due to the usage of the mirroring site as a fail-over site. In most cases, the storage administrator would not like to use A as its own mirroring site. (ii) B's set of storage capabilities 66 is the exactly the same as A's set of storage capabilities 66. Note that for this solution a capability specification must also include its release or configuration details. For example, having an "encryption" storage capability 66 is not sufficient, and release and configuration details are required in order to determine that both storage capabilities 66 are the same. (iii) B's set of storage capabilities 66 supports A's set of storage capabilities 66.

Therefore, service B can mirror service A if:

All service A's storage capabilities 66 are supported by B's storage capabilities 66.

All additional B storage capabilities 66 can be used as additional features and are not in contradiction to A's storage capabilities 66.

For example, if B supports machine-level encryption and A does not—B is still able to support mirroring for A. In other words, in embodiments of the present invention, an identified given storage service 68 may comprise one or more additional storage capabilities 66 not required by the storage management request (e.g., a mirroring request).

The above definition requires either that the storage services are aware of relationship to other storage capabilities 66 or that the storage administrator sets the following:

Does capability C1 contain capability C2? For example, does a given storage capability 66 comprising "Compression version 1.2" support mirroring for data stored using a second given storage capability 66 comprising "Compression 0.8"?

Can capability C be considered "non-disruptive additional"? For example, if a given storage capability 66 comprising "encryption" exists in the destination mirroring site, it does not have to exist in the source mirrored site as a pre-requisite.

The following is an example of a flow to implement mirroring using embodiments of the present invention:

---

CSA = Capability set for service A.
CSB = Capability set for service B.
CSBA = Empty Set. To be filled with B capabilities that contain A capabilities.
For each capability CA in CSA:
    foundMatch = false
    For each capability CB in CSB:
        If (CB equals CA) or (CB supports* CA):
            foundMatch = true;
            CSBA + = CB
            break;
    If (foundMatch is False):
        Return False;
// if we reached this point - all of A's capabilities are supported in B.
// now we should check that all additional B capabilities are "non-disruptive additionals".
For each CB in CSB:
    If CB is not in CSBA and is not "non-disruptive additional":
        Return False;
Return True;

---

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a storage management application, a specification of one or more storage capabilities required to be used by a first logical volume to store data;
within a plurality of interconnected storage systems, identifying, by the storage management application, a first given storage system based on the first given storage system being capable of implementing the one or more storage capabilities required to be used by the first logical volume to store the data;
within the plurality of interconnected storage systems, identifying, by the storage management application, a second given storage system based on the second given storage system being capable of implementing the one or more storage capabilities required to be used by the first logical volume to store the data, wherein each of the storage capabilities is selected from a group consisting of a compression capability, an encryption capability and a thin provisioning capability;
presenting, on an interface of the storage management application, the first given storage system and the second given storage system on a list of candidate storage systems capable of implementing the one or more storage capabilities required to be used by the first logical volume, wherein, when the second given storage system includes one or more additional storage capabilities not required by the first logical volume, the second given storage system is identified and included on the list of candidate storage systems only when each of the one or more additional storage capabilities does not conflict with the one or more storage capabilities of the first given storage system;
responsive to selecting the first given storage system and the second given storage system from the list of candidate storage systems on the interface, configuring the first given identified storage system to store the first logical volume, the first given identified storage system having a first physical storage controller controlling multiple respective first storage devices;
configuring the second given identified storage system to store a second logical volume, the second given identified storage system having a second physical storage controller controlling multiple respective second storage devices such that the second given identified storage system is different from the first given identified storage system; and
upon storing the data to the first logical volume, mirroring the data to the second logical volume.

2. The method according to claim 1, wherein the mirroring is selected from a group consisting of asynchronous mirroring and synchronous mirroring.

3. The method according to claim 1, and comprising
defining a plurality of storage services on the storage systems, each of the storage services comprising one or more of the storage capabilities for a subset of the storage resources; and
configuring a software defined storage (SDS) system comprising the defined storage services, wherein the first given storage system comprises a first given storage service, and wherein the second given storage system comprises a second given storage service, the first and the second given storage services comprising the one or more required storage capabilities.

4. The method according to claim 3, wherein the first given storage service comprises the one or more additional storage capabilities not required by the first logical volume.

5. The method according to claim 3, wherein the second given storage service comprises the one or more additional storage capabilities not required by the first logical volume.

6. The method according to claim 3, wherein the first given storage service is stored on a first subset of the storage systems, and wherein the second given storage service is stored on a second subset of the storage systems, the first and the second subsets of the storage systems comprising mutually exclusive subsets.

7. An apparatus, comprising:
multiple storage systems, each of the storage systems comprising a processor and one or more storage devices, wherein a given processor is configured:
to receive, by a storage management application, a specification of one or more storage capabilities required to be used by a first logical volume to store data;
within a plurality of interconnected storage systems, to identify, by the storage management application, a first given storage system based on the first given storage system being capable of implementing the one or more storage capabilities required to be used by the first logical volume to store the data;
within the plurality of interconnected storage systems, to identify, by the storage management application, a second given storage system based on the second given storage system being capable of implementing the one or more storage capabilities required to be used by the first logical volume to store the data, wherein each of the storage capabilities is selected from a group consisting of a compression capability, an encryption capability and a thin provisioning capability;
to present, on an interface of the storage management application, the first given storage system and the second given storage system on a list of candidate storage systems capable of implementing the one or more storage capabilities required to be used by the first logical volume, wherein, when the second given storage system includes one or more additional storage capabilities not required by the first logical volume, the second given storage system is identified and included on the list of candidate storage systems only when each of the one or more additional storage capabilities does not conflict with the one or more storage capabilities of the first given storage system;

responsive to selecting the first given storage system and the second given storage system from the list of candidate storage systems on the interface, to configure the first given identified storage system to store the first logical volume, the first given identified storage system having a first physical storage controller controlling multiple respective first storage devices, to configure the second given identified storage system to store a second logical volume, the second given identified storage system having a second physical storage controller controlling multiple respective second storage devices such that the second given identified storage system is different from the first given identified storage system, and upon storing the data to the first logical volume, to mirror the data to the second logical volume.

8. The apparatus according to claim 7, wherein the mirroring is selected from a group consisting of asynchronous mirroring and synchronous mirroring.

9. The apparatus according to claim 7, wherein the processor is configured to define a plurality of storage services on the storage systems, each of the storage services comprising one or more of the storage capabilities for a subset of the storage resources, and to configure a software defined storage (SDS) system comprising the defined storage services, wherein the first given storage system comprises a first given storage service, and wherein the second given storage system comprises a second given storage service, the first and the second given storage services comprising the one or more required storage capabilities.

10. The apparatus according to claim 9, wherein the first given storage service comprises the one or more additional storage capabilities not required by the first logical volume.

11. The apparatus according to claim 9, wherein the second given storage service comprises the one or more additional storage capabilities not required by the first logical volume.

12. The apparatus according to claim 9, wherein the first given storage service is stored on a first subset of the storage systems, and wherein the second given storage service is stored on a second subset of the storage systems, the first and the second subsets of the storage systems comprising mutually exclusive subsets.

13. A computer program product, the computer program product comprising:

a non-transitory computer readable storage medium having computer readable program code embodied therewith, the computer readable program code comprising:

computer readable program code configured to receive, by a storage management application, a specification of one or more storage capabilities required to be used by a first logical volume to store data;

computer readable program code configured to, within a plurality of interconnected storage systems, identify, by the storage management application, a first given storage system based on the first given storage system being capable of implementing the one or more storage capabilities required to be used by the first logical volume to store the data;

computer readable program code configured to, within the plurality of interconnected storage systems, identify, by the storage management application, a second given storage system based on the second given storage system being capable of implementing the one or more storage capabilities required to be used by the first logical volume to store the data, wherein each of the storage capabilities is selected from a group consisting of a compression capability, an encryption capability and a thin provisioning capability;

computer readable program code configured to present, on an interface of the storage management application, the first given storage system and the second given storage system on a list of candidate storage systems capable of implementing the one or more storage capabilities required to be used by the first logical volume, wherein, when the second given storage system includes one or more additional storage capabilities not required by the first logical volume, the second given storage system is identified and included on the list of candidate storage systems only when each of the one or more additional storage capabilities does not conflict with the one or more storage capabilities of the first given storage system;

computer readable program code configured to, responsive to selecting the first given storage system and the second given storage system from the list of candidate storage systems on the interface, arrange the first given identified storage system to store the first logical volume, the first given identified storage system having a first physical storage controller controlling multiple respective first storage devices;

computer readable program code configured to arrange the second given identified storage system to store a second logical volume, the second given identified storage system having a second physical storage controller controlling multiple respective second storage devices such that the second given identified storage system is different from the first given identified storage system; and computer readable program code configured upon storing the data to the first logical volume, to mirror the data to the second logical volume.

14. The computer program product according to claim 13, wherein the mirroring is selected from a group consisting of asynchronous mirroring and synchronous mirroring.

15. The computer program product according to claim 13, and comprising computer readable program code configured to define a plurality of storage services on the storage systems, each of the storage services comprising one or more of the storage capabilities for a subset of the storage resources; and computer readable program code configured to arrange a software defined storage (SDS) system comprising the defined storage services, wherein the first given storage system comprises a first given storage service, and wherein the second given storage system comprises a second given storage service, the first and the second given storage services comprising the one or more required storage capabilities.

16. The computer program product according to claim 15, wherein the first given storage service comprises the one or more additional storage capabilities not required by the first logical volume.

17. The computer program product according to claim 15, wherein the second given storage service comprises the one or more additional storage capabilities not required by the first logical volume.

18. The computer program product according to claim 15, wherein the first given storage service is stored on a first subset of the storage systems, and wherein the second given storage service is stored on a second subset of the storage systems, the first and the second subsets of the storage systems comprising mutually exclusive subsets.

* * * * *